Oct. 25, 1960     V. D. HUMPHREY     2,957,641
FISHING REEL CASTING DEVICE
Filed April 25, 1958
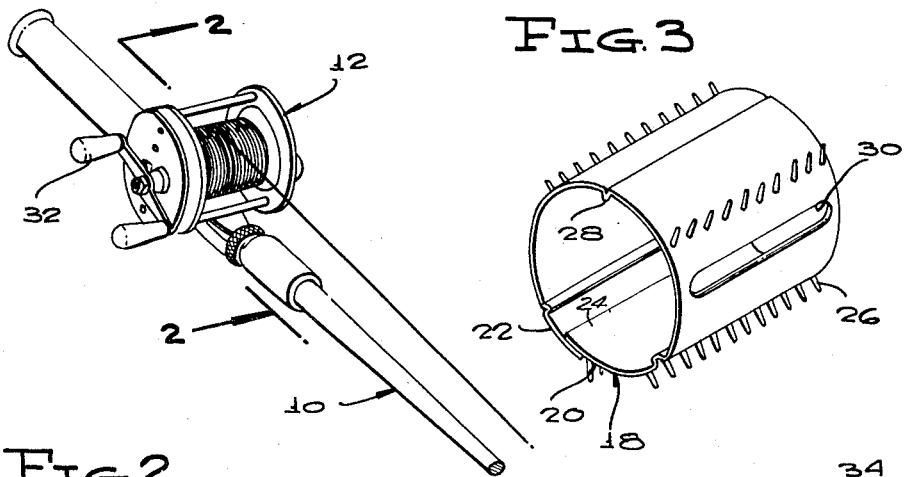
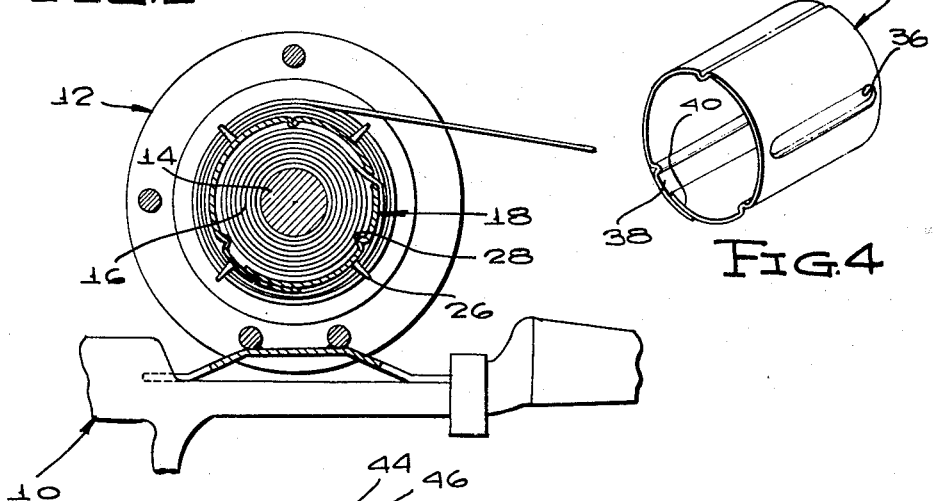
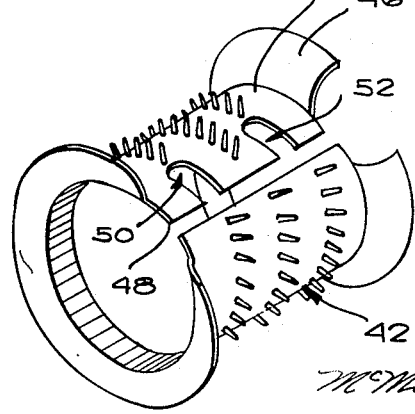
INVENTOR.
VONNIE D. HUMPHREY
BY
McMorrow, Berman & Davidson
ATTORNEYS

United States Patent Office 2,957,641
Patented Oct. 25, 1960

2,957,641

FISHING REEL CASTING DEVICE

Vonnie D. Humphrey, Trailer Haven, Melbourne, Fla.

Filed Apr. 25, 1958, Ser. No. 730,925

3 Claims. (Cl. 242—84.1)

The present invention relates to fishing reels generally and in particular to a casting device for attachment to a fishing reel.

An object of the present invention is to provide a fishing reel casting device which lends itself to ready attachment to and detachment from a fishing reel, and when attached, enables the user to cast a fishing line without entangling the line in a "back-lash" which frequently happens when the fishing reel continues to rotate after the cast portion of the line has left the reel or rotates at a rate of speed greater than the speed of the line leaving the reel at the conclusion of the interval in which the fishing line leaves the reel.

Another object of the present invention is to provide a casting device for attachment to a fishing reel which is simple in structure, one having long-life characteristics, and one which is economically feasible.

These and other objects and advantages of the present invention will be fully apparent from the following description when taken in conjunction with the annexed drawing, in which:

Figure 1 is an isometric portion of the butt end of a fishing rod with a reel mounted thereon and with the device of the present invention mounted upon the reel;

Figure 2 is a view on an enlarged scale, taken on the line 2—2 of Figure 1;

Figure 3 is an isometric view of the device of the present invention removed from the reel;

Figure 4 is an isometric view of a modified form of the device of the present invention; and Figure 5 is an isometric view of a further modified form of the device of the present invention.

Referring in greater detail to the drawing in which like numerals indicate like parts throughout the several views, the reference numeral 10 designates, in Figure 1, a fishing rod, only the butt end of which is shown, and the numeral 12 designates a fishing reel of conventional construction mounted upon the rod 10.

The reel 12 includes a hub 14 upon which is wound a fishing line 16 having one end fixed to the hub 14 by conventional means (not shown) and having the other end free and accessible.

The casting device of the present invention is designated generally by the reference numeral 18 and is adapted to be detachably supported upon the wound reel 12, totally encompassing the wound fishing line 16, as shown in Figure 2. The device 18 consists in a resilient split sleeve 20 having separated meeting side edges 22 and 24, as shown in Figure 3.

Spaced rows of spokes 26 project from the exterior face of the sleeve 20. Longitudinally extending ridges 28 are arranged in spaced relation about the inner face of the sleeve 20. The ridges 28 constitute anchoring means engaging the wound coils of fishing line 16 when the device 18 is positioned so as to encompass the fishing line 16 wound upon the hub 14, as shown in Figure 2.

The sleeve 20 is provided with a closed slot 30 extending longitudinally therealong and having its ends spaced from the ends of the sleeve 20. The slot 30 is spaced from the separated meeting edges 22 and 24 and is substantially diametrically opposite such meeting edges 22 and 24, as shown in Figure 3.

In use, the accessible free end of the fishing line 16 is insertable through the slot 30 with the portion of the fishing line 16 inwardly of the accessible free end being unwound from the hub 14 and withdrawn through the slot 30 until the free portion of the line 16 corresponds to a predetermined casting length as desired by the user. When such predetermined length of the fishing line 16 has been unwound from the hub 14 and drawn through the slot 30, the sleeve 20 is manually attached to the remaining wound coils of the line 16 by spreading the meeting edges 22 and 24 apart sufficiently to pass the hub 14 and line 16 remaining thereon between the meeting edges 22 and 24. The hub 14 is then rotated by the conventional reel handle 32 carried on one side of the reel 12 and the casting portion of the line 16 is then wound upon the sleeve 20 with the convolutions of the line 16 disposed between adjacent spokes 26 of the respective rows of spokes 26.

Upon casting, only the portion of the line 16 exteriorly of the sleeve 20 will be cast from the reel and no "back-lash" will result from over-extension of the line 16 from the reel 12. When it is desired to change the length of the free portion of the line 16 or to remove the device 18 from the hub 14, the free portion of the line 16 is unwound and the line 16 withdrawn through the slot 30 and the sleeve 20 removed from the wound coils of the line 16 on the hub 14.

In Figure 4, a modified form of the sleeve is shown and designated generally by the reference numeral 34. The sleeve 34 has a closed slot 36 spaced substantially diametrically with respect to the meeting edges 38 and 40. The use of the sleeve 34 is identical with the use of the sleeve 20, there being omitted only the spokes 26 between which convolutions of the fishing line are wound as the free end portion of the fishing line is wound thereon prior to casting.

In Figure 5, a further modified form of the device of the present invention is shown and is designated generally by the reference numeral 42. The device 42 has a sleeve 44 identical in all respects with the sleeve 20 except that on each of its ends it carries an outwardly curved flange 46 and inwardly of the one meeting edge 48 extends a pair of spaced slots 50 and 52 each selectively having the same purpose as either the slot 30 or the slot 36 in the embodiments of the invention as heretofore described. The device 42 is intended to totally encompass the wound coils of a fishing line on the hub of a fishing reel with the flanges 46 overlying the dished discs conventionally carried by the hub of such fishing reel.

In use, the forms of the invention shown in Figures 4 and 5 are employed in the manner described with reference to the form of the invention shown in Figures 1 to 3, inclusive. In any case, it will be found that a great deal of annoyance is saved the fisherman by the use of the present invention which eliminates the frequently occurring "back-lashes" which totally entangle a fishing line and consume much time and labor in the untangling thereof.

What is claimed is:

1. The combination with a fishing line reel, and a fishing line wound upon said reel and having an accessible free end, of a casting device detachably encompassing and supported upon said wound fishing line, said device including a resilient split sleeve having meeting side edges, there being a closed slot extending longitudinally of said sleeve and having its ends spaced from the ends of said sleeve, the accessible end of said fishing line being inserted in said slot with the portion of said fishing line inwardly of the accessible end being unwound from said reel and withdrawn through said slot until said portion corresponds to a predetermined casting length, said sleeve when said fishing line portion has been fully withdrawn through said slot being positioned so as to encompass the wound fishing line with the meeting edges adjacent each other, said fishing line portion when said sleeve is in the fixed encompassing position on said wound fishing line being wound exteriorly upon said sleeve.

2. The combination with a fishing line reel, and a fishing line wound upon said reel and having an accessible free end, of a casting device detachably encompassing and supported upon said wound fishing line, said device including a resilient split sleeve having meeting side edges, there being a closed slot extending longitudinally of said sleeve and having its ends spaced from the ends of said sleeve, the accessible end of said fishing line being inserted in said slot with the portion of said fishing line inwardly of the accessible end being unwound from said reel and withdrawn through said slot until said portion corresponds to a predetermined casting length, said sleeve when said fishing line portion has been fully withdrawn through said slot being positioned so as to encompass the wound fishing line with the meeting edges adjacent each other, said fishing line portion when said sleeve is in the fixed encompassing position on said wound fishing line being wound exteriorly upon said sleeve, and spaced anchoring means on the inner face of said sleeve and engaging said wound fishing line.

3. The combination with a fishing line reel, and a fishing line wound upon said reel and having an accessible free end, of a casting device detachably encompassing and supported upon said wound fishing line, said device including a resilient split sleeve having meeting side edges, there being a closed slot extending longitudinally of said sleeve and having its ends spaced from the ends of said sleeve, the accessible end of said fishing line being inserted in said slot with the portion of said fishing line inwardly of the accessible end being unwound from said reel and withdrawn through said slot until said portion corresponds to a predetermined casting length, said sleeve when said fishing line portion has been fully withdrawn through said slot being positioned so as to encompass the wound fishing line with the meeting edges adjacent each other, and spaced rows of spokes projecting from the exterior face of said sleeve, said fishing reel line portion when said sleeve is in the fixed encompassing position on said wound fishing line being wound so that the convolutions are disposed between adjacent spokes of the respective rows.

References Cited in the file of this patent
UNITED STATES PATENTS
2,367,214   Hedge _____ Jan. 16, 1945
FOREIGN PATENTS
446,334   Germany _____ June 27, 1927